United States Patent
Burk

(10) Patent No.: US 12,286,126 B2
(45) Date of Patent: *Apr. 29, 2025

(54) SECURE DEPLOYMENT OF A USER PROFILE IN A VEHICLE

(71) Applicant: Micron Technology, Inc., Boise, ID (US)

(72) Inventor: Michael Tex Burk, Orangevale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,352

(22) Filed: Nov. 30, 2022

(65) Prior Publication Data

US 2023/0092985 A1 Mar. 23, 2023

Related U.S. Application Data

(63) Continuation of application No. 16/789,104, filed on Feb. 12, 2020, now Pat. No. 11,541,898.

(51) Int. Cl.
*B60W 50/00* (2006.01)
*G06N 20/00* (2019.01)
(Continued)

(52) U.S. Cl.
CPC ......... *B60W 50/0098* (2013.01); *G06N 20/00* (2019.01); *G07C 5/008* (2013.01); *G07C 5/085* (2013.01)

(58) Field of Classification Search
CPC ... B60W 50/0098; G06N 20/00; G07C 5/008; G07C 5/085
(Continued)

(56) References Cited

U.S. PATENT DOCUMENTS 9,171,268 B1 10/2015 Penilla et al.
9,229,905 B1 1/2016 Penilla et al.
(Continued)

FOREIGN PATENT DOCUMENTS

WO 2019214799 11/2019

OTHER PUBLICATIONS

Hendrik Schweppe, et al. "Security and privacy for in-vehicle networks," IEEE 1st International Workshop on Vehicular Communications, Sensing, and Computing (VCSC), Aug. 27, 2021.
(Continued)

*Primary Examiner* — Isaac G Smith
(74) *Attorney, Agent, or Firm* — Greenberg Traurig

(57) ABSTRACT

A vehicle can have a user profile securely deployed in it according to a security protocol. The vehicle can include a body, a powertrain, vehicle electronics, and a computing system. The computing system of the vehicle can be configured to: retrieve information from a user profile according to a security protocol. The computing system of the vehicle can also be configured to receive a request for at least a part of the retrieved information from the vehicle electronics and send a portion of the retrieved information to the vehicle electronics according to the request. The computing system of the vehicle can also be configured to propagate information sent from the vehicle electronics back into the user profile according to the security protocol. And, the computing system of the vehicle can also be configured to store in its memory, according to the security protocol, information sent from the vehicle electronics.

16 Claims, 5 Drawing Sheets

(51) Int. Cl.
    *G07C 5/00* (2006.01)
    *G07C 5/08* (2006.01)
(58) Field of Classification Search
    USPC .......................................................... 701/32.1
    See application file for complete search history.

(56) References Cited

U.S. PATENT DOCUMENTS

| | | |
|---|---|---|
| 9,288,270 B1 | 3/2016 | Penilla et al. |
| 11,541,898 B2 | 1/2023 | Burk |
| 2015/0178737 A1 | 6/2015 | Simpson et al. |
| 2018/0349975 A1 | 12/2018 | Lee |
| 2018/0364727 A1 | 12/2018 | Huai |
| 2019/0228367 A1* | 7/2019 | Longo ............ G06Q 10/063112 |
| 2020/0043056 A1 | 2/2020 | Marsh |
| 2020/0143488 A1 | 5/2020 | Kwon |
| 2020/0204643 A1* | 6/2020 | Zhou ................. H04M 1/72448 |
| 2020/0290626 A1* | 9/2020 | Chen ...................... B60K 35/00 |
| 2021/0129780 A1* | 5/2021 | Mezaael .............. B60N 2/0248 |
| 2021/0152665 A1* | 5/2021 | Hart ...................... H04W 12/06 |
| 2021/0245772 A1 | 8/2021 | Burk |

OTHER PUBLICATIONS

International Search Report and Written Opinion, PCT/US2021/017263, mailed on Jun. 4, 2021.
Extended European Search Report, EP21753275.3, mailed on Feb. 5, 2024.

* cited by examiner

500

```
retrieving, by a mobile device, a user profile from at least one other computing device
502
```
↓
```
receiving, from a vehicle, a request for information of the user profile
504
```
↓
```
sending, to the vehicle, information of the user profile according to a security protocol and
the request
506
```
↓
```
receiving, from the vehicle, information propagated from a body control module, a
powertrain control module, and/or another type of control module of the vehicle
508
```
↓
```
updating the user profile with at least part of the information propagated from the
control module(s) according to the security protocol
510
```
↓
```
sending the updated user profile to the at least one other computing device
512
```

FIG. 5

SECURE DEPLOYMENT OF A USER PROFILE IN A VEHICLE

RELATED APPLICATIONS

The present application is a continuation application of U.S. patent application Ser. No. 16/789,104 filed Feb. 12, 2020, the entire disclosure of which application is hereby incorporated herein by reference.

FIELD OF THE TECHNOLOGY

At least some embodiments disclosed herein relate to secure deployment of a user profile in a vehicle.

BACKGROUND

Vehicles can include cars, trucks, boats, and airplanes, as well as vehicles or vehicular equipment for military, construction, farming, or recreational use. Vehicles can be customized or personalize via vehicle electronics. Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery such as conventional cars, trucks, motorcycles, boats, planes, military vehicles, forklifts, tractors and excavators. Related elements for control of electrical vehicular systems are also found in hybrid and electric vehicles such as hybrid or electric automobiles. For example, electric cars can rely on power electronics for main propulsion motor control and managing the battery system.

In general, vehicle electronics can be distributed systems and can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy in to six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

A user profile is an electronic, digital, or computerize representation of a specific user. User profiles can be used by operating systems, computer programs, other types of computing systems, e-commerce and social media systems, as well as automotive infotainment systems. A mobile user profile is a type of user profile that can be used by at least a mobile device. A user profile can include a representation of a person's identity and can be considered a computer representation of a user model. A user model is data structure that can be used to capture certain characteristics about an individual user. And, the process of obtaining the user profile can be called user modeling or profiling. A user profile can also be used to store the description of characteristics of a person. The information of a user profile can be used by various types of systems such as any type of system considering characteristics and preferences of a person.

The use of user profiles by vehicle systems, such as vehicle infotainment systems and passenger comfort systems, has become prevalent. However, with such use of user profiles, information security is a significant concern. And, securing information about a user of a vehicle that can be shared over a wireless network can be complex. Thus, there are many technical problems to solve with the deployment of user profiles in vehicles.

BRIEF DESCRIPTION OF THE DRAWINGS

The present disclosure will be understood more fully from the detailed description given below and from the accompanying drawings of various embodiments of the disclosure.

FIGS. 4 and 5 illustrate flow diagrams of example operations that can be performed by aspects of the networked system depicted in FIGS. 1 to 3, in accordance with some embodiments of the present disclosure.

DETAILED DESCRIPTION

Figure 1:
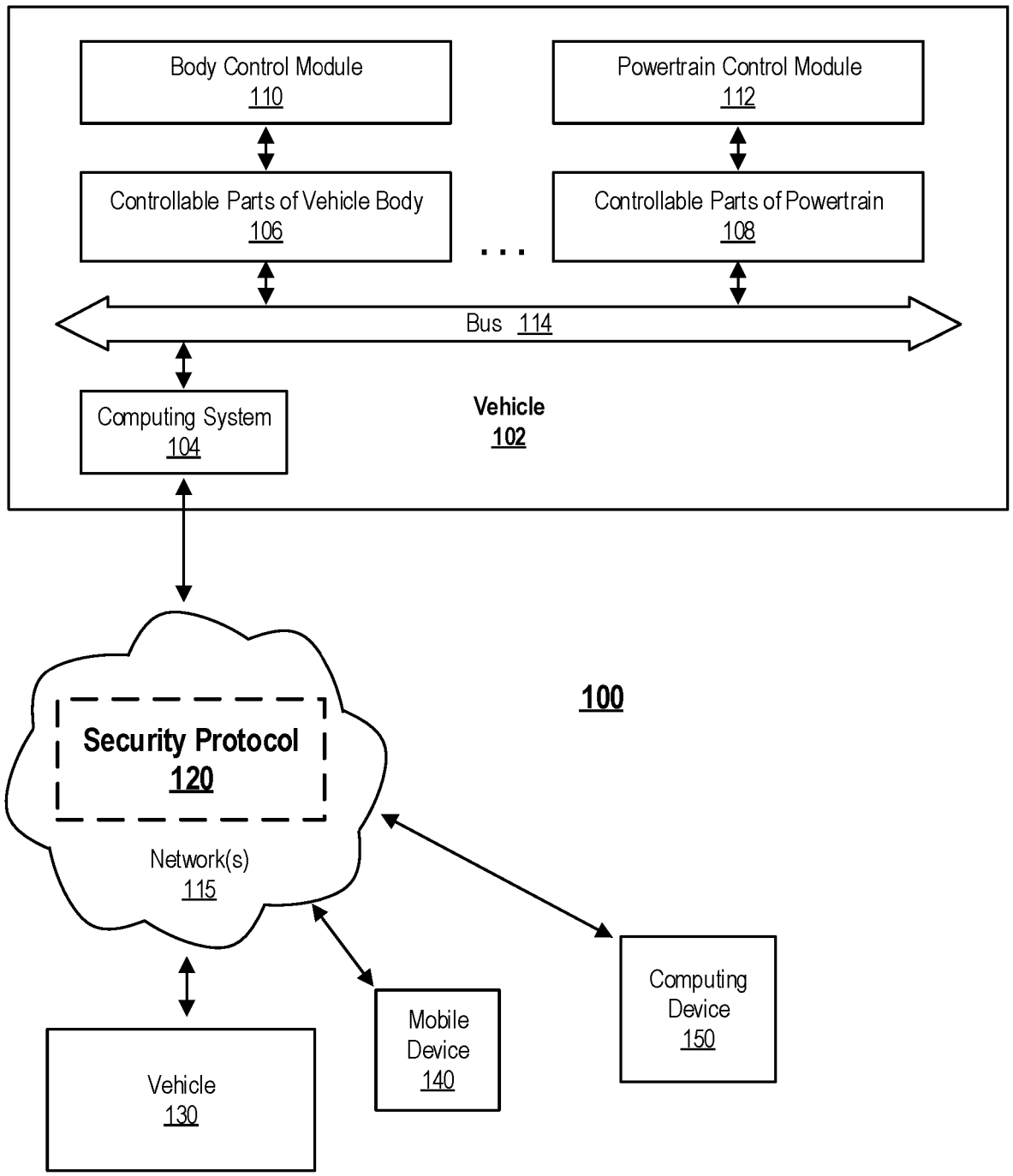
FIGS. 1 to 3 illustrate an example networked system that is configured to implement secure deployments of user profiles in vehicles via a security protocol, in accordance with some embodiments of the present disclosure.

At least some embodiments disclosed herein relate to secure deployment of a user profile in a vehicle via a security protocol. As mentioned herein, the use of user profiles by vehicle systems, such as vehicle infotainment systems and passenger comfort systems, has become prevalent. This is especially the case with luxury vehicles. However, with such use of user profiles, information security is a significant concern. And, securing information about a user of a vehicle that can be shared over a wireless network can be complex. Thus, there are many technical problems to solve with the deployment of user profiles in vehicles. An example solution to mitigate technical problems in the deployment of user profiles in vehicles is to utilize a security protocol as described herein.

For the purposes of this disclosure, a security protocol is an agreement or a set of conventions governing the treatment of data in an electronic communications system. The security protocol can govern the type of data that can be used, stored, and shared by a vehicle as well as the type of data that can be used, stored, and shared by a mobile device or a computing device. Also, the security protocol can govern the type of data that can be shared between a vehicle and a mobile device or a computing device. For example, the security protocol can govern which portion of a user profile can be shared with a vehicle and its systems. Also, the security protocol can govern what the vehicle is allowed to do with the information about a user (e.g., store it for the user, anonymize it for analytics or machine learning, use it for other users, feed it back to the user profile, refrain from using it, etc.). Also, the security protocol can provide the rules for which part of a user profile the vehicle is allowed to use. The security protocol can provide the criteria for authorizing access to or use of information about a user and information from a user profile.

Also, the security protocol can limit retrieval of information from the user profile by a vehicle computing system. And, the retrieval of information from the user profile can be via data fields of the user profile that are selected according to the security protocol. This selection according to the security protocol can prevent or permit access to the data fields of the user profile to control the type of information accessible in the user profile.

As mentioned, at least some embodiments disclosed herein relate to secure deployment of a user profile in a vehicle via a security protocol. A user profile can include various aspects, such as identity, preferences in different categories, histories of activities in different categories, etc. The security protocol disclosed herein, can allow a selectively authorized portion of a user profile to be deployed in a vehicle for use by the vehicle to personalize services for the user. The protocol controls what information in the user profile is accessible to the vehicle, what information relating to the user activity in the vehicle can be propagated back into the user profile, and the what information the vehicle can retain about the user activity in the vehicle.

The security protocol can also limit propagation of information back into the user profile by a vehicle computing system to restrict addition or alteration of data to the user profile by the computing system of the vehicle to regulate the type of information to be propagated back into the user profile by the computing system of the vehicle. And, the information sent from a body control module, a powertrain control module, or another type of control module of the vehicle can relate to user activity in the vehicle. And, the storing, in the memory of the vehicle, of information sent from a control module can be according to the security protocol to regulate the type of information the vehicle is permitted to retain about the user. Also, the type of information the vehicle is permitted to retain can include predetermined types of information relating to user activity in the vehicle Also, at least some embodiments disclosed herein relate to vehicles that can use and generate information about a user (such as information that can be a part of a user profile).

An example vehicle in some embodiments can include a body, a powertrain, vehicle electronics, and a computing system. The vehicle can have a user profile securely deployed in it according to a security protocol. The computing system of the vehicle can be configured to retrieve information from a user profile according to the security protocol. The computing system of the vehicle can also be configured to receive a request for at least a part of the retrieved information from the vehicle electronics and send a portion of the retrieved information to the vehicle electronics according to the request and/or the security protocol. The computing system of the vehicle can also be configured to propagate information sent from the vehicle electronics back into the user profile according to the security protocol. And, the computing system of the vehicle can also be configured to store in its memory, according to the security protocol, information sent from the vehicle electronics.

In some embodiments, the powertrain of a vehicle can be attached to a body and/or a chassis of the vehicle. The powertrain of the vehicle can include an engine, suspension and steering systems, and a final drive. The final drive can include at least one of wheels, a continuous track, propeller, a reaction-propulsion or electric-propulsion drive, or any combination thereof. The vehicle electronics of such a vehicle can include electronics for the body, or the powertrain, or any combination thereof.

At least some embodiments disclosed herein can be, include, or be a part of a networked system that includes computing devices, mobile devices and vehicles and that is configured to implement secure deployments of user profiles in vehicles via a security protocol. Such a system can include a vehicle that includes at least a body, a powertrain, vehicle electronics, and a computing system. The system can also include a mobile device that includes at least a user interface and a computing system. Also, the system can include one or more computing devices (such as devices in cloud computing or peer-to-peer computing) that can communicate a user profile to a mobile device of a user.

In some embodiments, the user interface (UI) of a mobile device can include any type of UI. And, the computing system of the mobile device can be configured to: receive a request from a vehicle for information in a user profile; send, to the vehicle, information in the user profile according to a security protocol and the request; receive, from the vehicle, information propagated from a body control module or a powertrain control module of the vehicle; and update, according to the security protocol, the user profile with at least part of the information propagated from the body control module or the powertrain control module.

Figure 2:
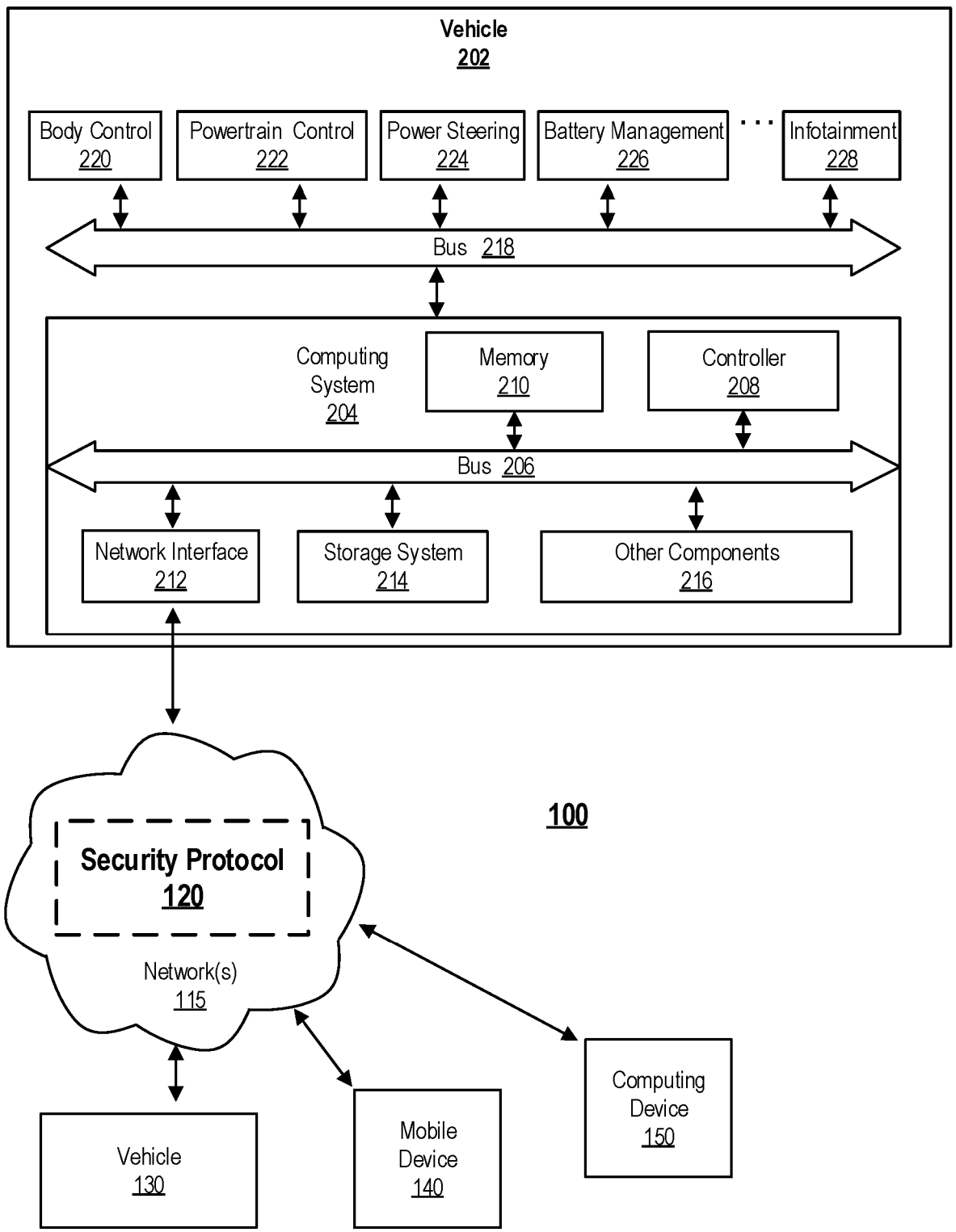
Figure 3:
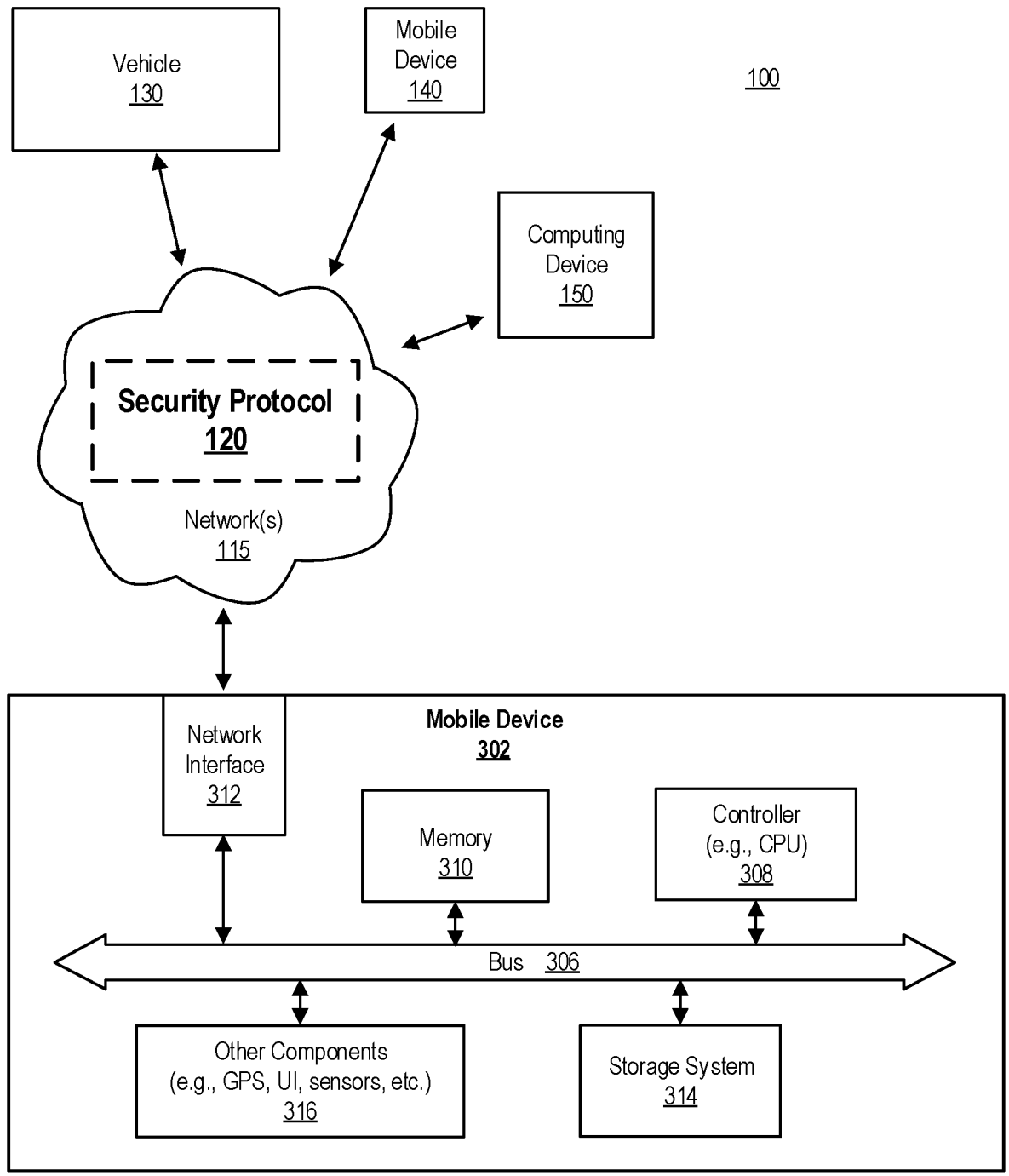

FIGS. 1 to 3 illustrate an example networked system 100 that includes at least vehicles and computing devices (e.g., see vehicles 102, 202, and 130, mobile devices 140 and 302 and computing device 150) and that is configured to implement secure deployments of user profiles in vehicles via a security protocol, in accordance with some embodiments of the present disclosure.

As shown in FIGS. 1-3, the networked system 100 is networked via one or more communications networks 115. Communication networks described herein, such as communications network(s) 115, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see vehicles 102, 202, and 130, mobile devices 140 and 302 and computing device 150) can each be a part of a peer-to-peer network, a client-server network, a cloud computing environment, or the like. Also, any of the apparatuses, computing devices, vehicles, sensors or cameras, and/or user interfaces described herein can include a computing system of some sort (e.g., see vehicle computing systems 104 and 204). And, a computing system can include a network interface to other devices in a LAN, an intranet, an extranet, and/or the Internet. The computing system can also operate in the capacity of a server or a client machine in client-server network environment, as a peer machine in a peer-to-peer (or distributed) network environment, or as a server or a client machine in a cloud computing infrastructure or environment.

Also, as shown in FIGS. 1-3, the networked system 100 can provide communication channels between its nodes, via network(s) 115, according to a security protocol 120. The security protocol 120 can be, include, or be a part of an agreement or a set of conventions governing the treatment of data in an electronic communications system such as the electronic communications system in the networked system 100. The security protocol 120 can govern the type of data that can be used, stored, and shared by a vehicle in the networked system 100 as well as the type of data that can be used, stored, and shared by a mobile device or a computing device in the networked system 100. Also, the security protocol 120 can govern the type of data that can be shared between a vehicle and a mobile device or a computing device in the networked system 100. For example, the security protocol can govern which portion of a user profile can be shared with the vehicle 102, 202, or 130 and its systems. Also, the security protocol 120 can govern what a vehicle is allowed to do with the information about a user (e.g., store it for the user, anonymize it for analytics or machine learning, use it for other users, feed it back to the user profile, refrain from using it, etc.). Also, the security protocol 120 can provide the rules for which part of a user profile the vehicle is allowed to use. The security protocol 120 can provide the criteria for authorizing access to or use of information about a user and information from a user profile.

As shown in FIG. 1, the system 100 can include at least a vehicle 102 that includes a vehicle computing system 104, a body and controllable parts of the body 106, a powertrain and controllable parts of the powertrain 108, a body control module 110, a powertrain control module 112, and a bus 114 that connects at least the vehicle computing system, the body control module, and the powertrain control module. Also, as shown, the vehicle 102 is connected to the network(s) 115 via the vehicle computing system 104. Also, shown, vehicle 130, mobile device 140, and computing device 150 are connected to the network(s) 115. And, thus, are communicatively coupled to the vehicle 102. The bus 114 can include a controller area network bus (CAN bus) or other forms of communications infrastructure in a vehicle that allow devices such as microcontrollers to communicate with each other in the vehicle, such as Ethernet. In some embodiments, the bus 114 can include gateways where in vehicle device interaction is abstracted with application programming interfaces (APIs) such as for security and safety.

The vehicle 102 includes vehicle electronics, including at least electronics for the controllable parts of the body 106 and the controllable parts of the powertrain 108. As shown, the vehicle 102 includes the controllable parts of the body 106 and such parts and subsystems being connected to the body control module 110. The body includes at least a frame to support the powertrain. A chassis of the vehicle can be attached to the frame of the vehicle. The body can also include an interior for at least one driver or passenger. The interior can include seats. The controllable parts of the body 106 can also include one or more power doors and/or one or more power windows. The body can also include any other known parts of a vehicle body. And, the controllable parts of the body 106 can also include a convertible top, sunroof, power seats, and/or any other type of controllable part of a body of a vehicle. The body control module 110 can control the controllable parts of the body 106.

Also, as shown, the vehicle 102 also includes the controllable parts of the powertrain 108. The controllable parts of the powertrain 108 and its parts and subsystems are shown being connected to the powertrain control module 112. The controllable parts of the powertrain 108 can include at least an engine, transmission, drive shafts, suspension and steering systems, a final drive, and powertrain electrical systems. The final drive can include at least one of wheels, a continuous track, propeller, a reaction-propulsion or electric-propulsion drive, or any combination thereof. The powertrain can also include any other known parts of a vehicle powertrain and the controllable parts of the powertrain 108 can include any other known controllable parts of a powertrain.

In some embodiments, as shown in FIG. 1, a vehicle (e.g., see vehicle 102 or 202) can include at least a body, a powertrain, a powertrain control module (e.g., see powertrain control module 112), and a vehicle computing system (e.g., see vehicle computing system 104). In such embodiments and others, the vehicle computing system (e.g., see vehicle computing system 104) can be configured to retrieve information from a user profile according to a security protocol (e.g., see security protocol 120). The vehicle computing system can also be configured to receive, from the powertrain control module, a request for at least a part of the retrieved information. The vehicle computing system can also be configured to send a portion of the retrieved information to the powertrain control module according to the request from the powertrain control module. The vehicle computing system can also be configured to propagate information sent from the powertrain control module back into the user profile according to the security protocol. The vehicle computing system can also be configured to store, according to the security protocol, in a memory of the vehicle computing system (e.g., see memory 210 of computing system 204), information sent from the powertrain control module. Also, in such embodiments and others, the powertrain control module can be configured to control controllable parts of the powertrain (e.g., see controllable parts of the powertrain 108) according to the portion of the retrieved information of the user profile.

Further, in such embodiments and others, the vehicle can include a body control module (e.g., see body control module 110) configured to control controllable parts of the body (e.g., see control controllable parts of the body 106). And, the vehicle computing system can be configured to receive, from the body control module, a request for at least a part of the retrieved information. The vehicle computing system can also be configured to send a second portion of the retrieved information to the body control module according to the request from the body control module. The vehicle computing system can also be configured to propagate information sent from the body control module back into the user profile according to the security protocol. And, the vehicle computing system can also be configured to store, according to the security protocol, in the memory of the vehicle computing system, information sent from the body control module. Also, in such embodiments, the body control module can be configured to control controllable parts of the body according to the second portion of the retrieved information of the user profile.

In such embodiments and others, when the vehicle is used by a user, the vehicle computing system can be configured to: generate data about use of the vehicle by the user; and add the generated data to the user profile according to the security protocol.

Also, the vehicle computing system can be configured to anonymize at least part of the retrieved information of the user profile according to the security protocol to provide the anonymized information as input for analytics. And, the analytics can include analytics of data retrieved from a plurality of user profiles. The analytics can provide feedback to the user profile according to the analytics and/or the security protocol. Also, the security computing system can be configured to anonymize at least part of the retrieved information of the user profile according to the security protocol to provide the anonymized information as input for machine learning to generate statistics and other machine learned information to be combined with generated statistics and other machine learned information of other users. The machine learning can provide feedback to the user profile according to the generated statistics and other machine learned information and/or according to the security protocol.

In such embodiments and others, the user profile can include an identification of a user, preferences of the user in a plurality of categories, and histories of activities of the user associated with the plurality of categories. The the plurality of categories can include driving preferences of the user and the histories of activities can include histories of driving activities of the user. The plurality of categories can include driving preferences of the user communicated from the vehicle and other sources, and the histories of activities can include histories of driving activities of the user communicated from the vehicle and other sources.

In some embodiments, the computing system 104 can be configured to receive a plurality of data fields of a user profile of a user from a mobile device (e.g., see mobile devices 140, 150, and 302), according to the security protocol. The plurality of data fields can include settings of a plurality of components of the vehicle or another vehicle for the user. The set of components of the vehicle 102 can include components of the controllable parts of the body 106, or the controllable parts of the powertrain 108, or any combination thereof.

In some embodiments, the computing system 104 can be configured to identify settings of the components of the vehicle 102, according to the security protocol 120. The computing system 104 can also be configured to communicate the identified settings to the mobile device used by the user to update a version of the user profile stored on the mobile device, according to the security protocol 120.

In some embodiments, the computing system 104 can include a central control module (CCM), central timing module (CTM), and/or general electronic module (GEM).

Also, in some embodiments, the vehicle can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), Door control unit (DCU), or the like. Types of ECU can include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

As shown in FIG. 2, the system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 115 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204. The computing system 204 can be communicatively coupled to the network(s) 115 as shown. The computing system 204 includes at least a bus 206, a controller 208 (such as a CPU), memory 210, a network interface 212, a data storage system 214, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 206 communicatively couples the controller 208, the memory 210, the network interface 212, the data storage system 214 and the other components 216. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), crosspoint memory, crossbar memory, etc.), and data storage system 214, which communicate with each other via bus 206 (which can include multiple buses).

In some embodiments, the computer system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 115).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a bus 218 that connects at least the vehicle computing system 204, the vehicle body control module, the powertrain control module, the power steering control unit, the battery management system, and the infotainment electronics. Also, as shown, the vehicle 202 is connected to the network(s) 115 via the vehicle computing system 204. Also, shown, vehicle 130 and mobile devices 140 and 150 are connected to the network(s) 115. And, thus, are communicatively coupled to the vehicle 202. The bus 218 can include a controller area network bus (CAN bus) or other forms of communications infrastructure in a vehicle that allow devices such as microcontrollers to communicate with each other in the vehicle, such as Ethernet. In some embodiments, the bus 218 can include gateways where in vehicle device interaction is abstracted with application programming interfaces (APIs) such as for security and safety.

As shown, the vehicle 202 includes vehicle electronics, including at least electronics for the body and the powertrain of the vehicle as well as for other components of the vehicle. It can be inferred from FIG. 2 that the vehicle 202 includes at least the body, the body's interior (which can have seats and other interior furnishings), the powertrain, the climate control system, the infotainment system since corresponding electronics are shown as being a part of the vehicle 202. The body of the vehicle 202 includes at least a frame to support the powertrain as well as body electrical systems. A chassis of the vehicle 202 can be attached to the frame of the vehicle. The interior can provide seating for at least one driver or passenger. In other words, the interior can include one or more seats. The body can also include one or more doors and/or one or more windows. The body can also include any other known parts of a vehicle body. Also, the powertrain can include any other known parts of a vehicle powertrain.

In some embodiments, the body of the vehicle 202 can include doors and windows and an interior of the body can include seating, a dashboard, or center console, or any combination thereof. The body and the interior can also include or the vehicle 202 can also include passenger and driver comfort systems having climate control systems, or seat adjustment systems, or any combination thereof. The body and the interior can also include or the vehicle 202 can also include information and entertainment systems (or an infotainment system which is a combination of information and entertainment systems). As shown, the vehicle electronics of vehicle 202 can include electronics for the interior, the passenger and driver comfort systems, and the information and entertainment systems. And, in such embodiments, the set of components of the vehicle can include components of the interior, the passenger and driver comfort systems, or the information and entertainment systems, or any combination thereof.

Since the computing system 204 can be similar to the computing system 104, it can be configured to perform at least the same functions as the computing system 104.

In some embodiments, such as in vehicles 102 and 202, the powertrain can include a braking system, an exhaust system, a fuel supply system, or a transmission system, or any combination thereof.

In some embodiments, such as in vehicles 102 and 202, a communication of data from the vehicle to the mobile device is over a secured and authenticated connection (such as a secured and authenticated connection over network(s) 115), and the user profile can be communicated, by the mobile device to the computing system of the vehicle over a similar secured and authenticated connection. And, the secured and authenticated connection can be provided at least according to the security protocol 120.

In some embodiments, the computing system 204 can include a central control module (CCM), central timing module (CTM), and/or general electronic module (GEM).

Also, in some embodiments, the vehicle 202 can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), Door control unit (DCU), or the like. Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

In some embodiments, the user profile is associated with the user, the plurality of data fields is related to driver preferences of the user, and the driver preferences can include one or more groups of settings for vehicle components, each group of the group(s) of settings is for a specific vehicle product having a vehicle make and model. The driver preferences can also include a plurality of user-inputted preferences, each user-inputted preference of the plurality of user-inputted preferences is either a general vehicular preference, a preference related to a vehicle product, a preference related to a vehicle model, or a preference related to a vehicle brand. In such embodiments, each group of the group(s) of settings can include settings for a vehicle body, a powertrain, a chassis, vehicle electronics, a vehicle interior, passenger and driver comfort systems, or vehicle information and entertainment systems, or any combination thereof. In such embodiments, each group of the group(s) of settings can include automated driving configurations.

In such embodiments, the plurality of user-inputted preferences can include driving mode preferences of the user for at least one of a vehicle product, or a vehicle model, or any combination thereof. The driving mode preferences can include preferences for at least one of a performance mode, a fuel economy mode, a tow mode, an all-electric mode, a hybrid mode, an AWD mode, a FWD mode, a RWD mode, or a 4WD mode, or any combination thereof for at least one of a vehicle product, or a vehicle model, or any combination thereof.

As shown in FIG. 3, the system 100 can include at least a mobile device 302. The mobile device 302, which can have somewhat similar structure and/or functionality as the computing system 104 or 204, can be connected to communications network(s) 115. And, thus, be connected to vehicles 102, 202, and 130 as well as mobile device 140 and computing device 150.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 115 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices or computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 115 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors as well as a camera). The other components 316 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 115).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 304. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the storage system 314, which are all components of the computing system). The computing system of the mobile device 302 can be configured to receive a request from a vehicle for information in a user profile. The computing system of the mobile device 302 can also be configured to send, to the vehicle, information in the user profile according to a security protocol and the request. The computing system of the mobile device 302 can also be configured to receive, from the vehicle, information propagated from a body control module or a powertrain control module of the vehicle. And, the computing system of the mobile device 302 can also be configured to update, according to the security protocol, the user profile with at least part of the information propagated from the body control module or the powertrain control module.

Figure 4:
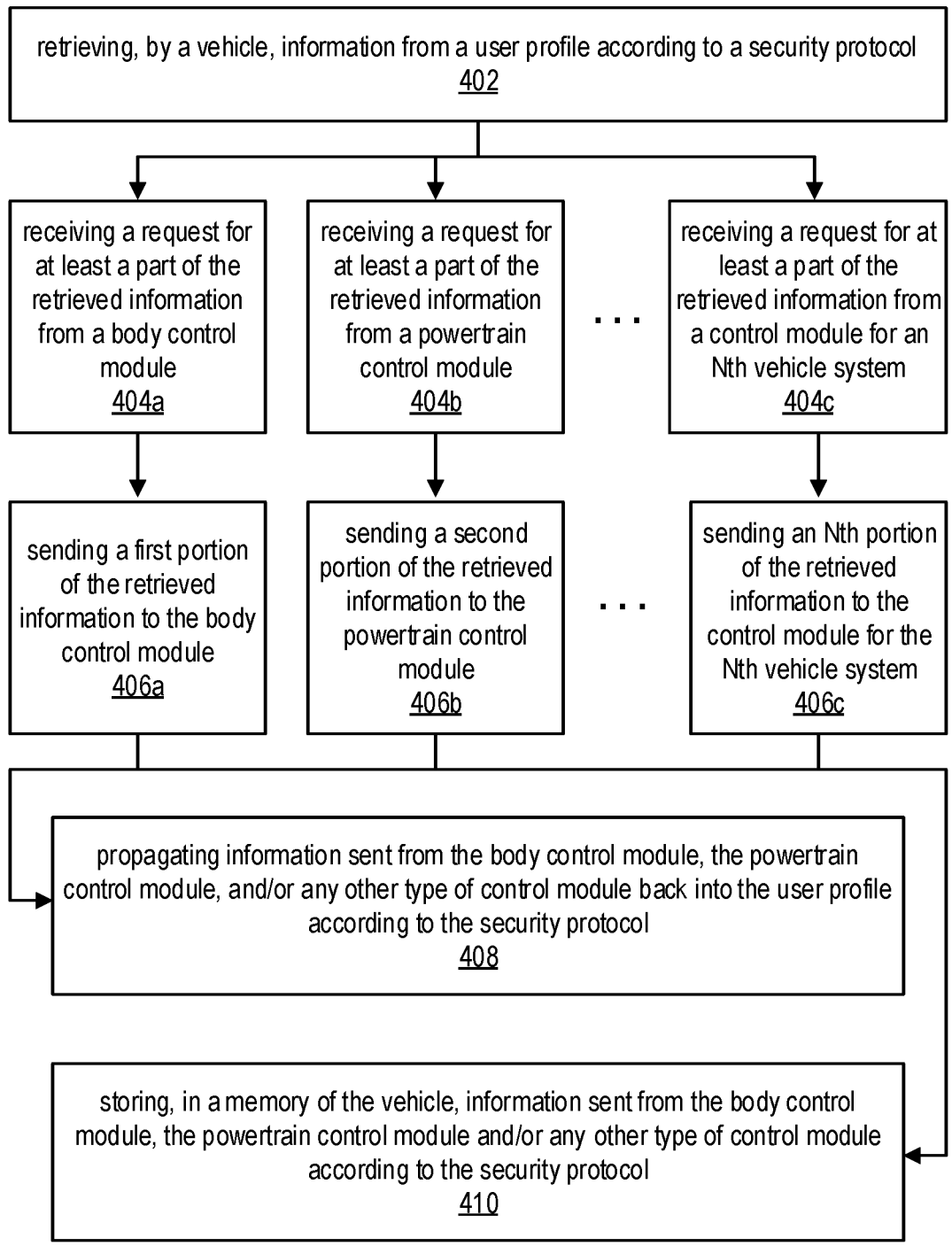

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle depicted in FIGS. 1 to 3.

In FIG. 4, the method 400 begins at step 402 with retrieving, by a vehicle (e.g., see vehicles 102 and 202), information from a user profile according to a security protocol (e.g., see security protocol 120). For example, step 402 can include retrieving, by a computing system of a vehicle (e.g., see computing systems 104 and 204), information in a user profile from a mobile device (e.g., see mobile devices 140 and 302) according to a security protocol.

At step 404a, the method 400 continues with receiving, by the vehicle or a computing system of the vehicle, a request for at least a part of the retrieved information from a body control module. At step 404b, the method 400 continues with receiving, by the vehicle or the computing system of the vehicle, a request for at least a part of the retrieved information from a powertrain control module. At step 404c, the method 400 continues with receiving, by the vehicle or the computing system of the vehicle, a request for at least a part of the retrieved information from another control module that is not the body control module nor the powertrain control module. Step 404c, illustrates that there are many types of control modules of a vehicle that can send a request for at least a part of the retrieved information, and that the vehicle or the computing system of the vehicle can receive such a request for at least a part of the retrieved information from any type of control module of the vehicle.

At step 406a, the method 400 continues with sending, by the vehicle or the computing system of the vehicle, a first portion of the retrieved information to the body control module according to the request from the body control module. At step 406b, the method 400 continues with sending, by the vehicle or the computing system of the vehicle, a second portion of the retrieved information to the powertrain control module according to the request from the powertrain control module. At step 406c, the method 400 continues with sending, by the vehicle or the computing system of the vehicle, another portion of the retrieved information to the control module that is not the body control module nor the powertrain control module according to the request from the control module that is not the body control module nor the powertrain control module. Step 406c, illustrates that there are many types of control modules of a vehicle that can receive another portion of the retrieved information, and that the vehicle or the computing system of the vehicle can send such information to any type of control module of the vehicle. The sending at steps 406a, 406c, 406c can also be according to the security protocol.

At step 408, the method 400 continues with propagating, by the vehicle or the computing system of the vehicle, information sent from the body control module, the powertrain control module, and/or any other type of control module back into the user profile according to the security protocol. For example, step 408 can include propagating, by the vehicle or the computing system of the vehicle, information sent from the body control module back into the user profile at the mobile device according to the security protocol.

At step 410, the method 400 continues with storing, according to the security protocol, in a memory of the vehicle, information sent from the body control module, the powertrain control module, and/or any other type of control module.

Not shown in FIG. 4, the method 400 can include controlling, by the body control module, controllable parts of the body according to the first portion of the retrieved information of the user profile. Also, the method 400 can include controlling, by the powertrain control module, controllable parts of the powertrain according to the second portion of the retrieved information of the user profile. And, the method 400 can include controlling, by another type of control module of the vehicle, corresponding controllable parts according to another portion of the retrieved information of the user profile. Also, not shown, the method 400 can include, when the vehicle is used by a user, generating, by the vehicle or the computing system of the vehicle, data about use of the vehicle by the user as well as adding, by the vehicle or the computing system of the vehicle, the generated data to the user profile according to the security protocol.

In some embodiments, the method 400 can include anonymizing at least part of the retrieved information of the user profile according to the security protocol to provide the anonymized information as input for analytics, and the analytics can include analytics of data retrieved from a plurality of user profiles. The method 400 can also include the analytics providing feedback to the user profile according to the security protocol. The method 400 can also include anonymizing at least part of the retrieved information of the user profile according to the security protocol to provide the anonymized information as input for machine learning to generate statistics and other machine learned information to be combined with generated statistics and other machine learned information of other users. The method 400 can also include the machine learning providing feedback to the user profile according to the security protocol.

In such embodiments and other, the user profile can include an identification of a user, preferences of the user in a plurality of categories, and histories of activities of the user associated with the plurality of categories. The plurality of categories can include driving preferences of the user and the histories of activities can include histories of driving activities of the user.

The powertrain components can include couplings to the chassis, engine components, suspension and steering components, the final drive, and powertrain electrical systems. With vehicles having internal combustion powered machinery, the powertrain components can include ignition, engine and transmission components. The powertrain components can also include related components for control of electrical systems which can be found in hybrid and electric vehicles such as hybrid or electric automobiles. For example, the powertrain components can include power electronics for the main propulsion motor control as well as managing the battery system. And, the powertrain components can include electronics for propulsion and control of autonomous cars and vehicles. In some embodiments, powertrain and its components can include an engine, suspension and steering systems, and a final drive. The final drive can include at least one of wheels, a continuous track, propeller, a reaction-propulsion or electric-propulsion drive, or any combination thereof. And, in such embodiments and others, the vehicle electronics can include electronics for the powertrain.

In some embodiments, including the embodiments described with respect to method 400 as well as method 500, the user profile can be associated with the user and the plurality of data fields can be related to driver preferences of the user. The driver preferences can include one or more groups of settings for vehicle components. Each group of the group(s) of settings can be for a specific vehicle product having a vehicle make and model. Also, the driver preferences can include a plurality of user-inputted preferences. Each user-inputted preference of the plurality of user-inputted preferences can be either a general vehicular preference, a preference related to a vehicle product, a preference related to a vehicle model, or a preference related to a vehicle brand.

Also, each group of the group(s) of settings can include settings for a vehicle body, a powertrain, a chassis, vehicle electronics, a vehicle interior, passenger and driver comfort systems, or vehicle information and entertainment systems, or any combination thereof. And, each group of the group(s) of settings can include automated driving configurations. For example, each group of the group(s) of settings can include settings for configurations and preferences related to the various levels of automation according to the SAE. Each group of the group(s) of settings can include settings for: no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5).

In some embodiments, it is to be understood that steps 402 to 410 can be implemented as a continuous process such as each step can run independently by monitoring input data, performing operations and outputting data to the subsequent step. Also, steps 402 to 410 can be implemented as discrete-event processes such as each step can be triggered on the events it is supposed to trigger and produce a certain output.

It is to be also understood that FIG. 4 represents a minimal method within a possibly larger method of a computer system more complex than the ones presented partly in FIGS. 1 to 3. Thus, the steps depicted in FIG. 4 can be combined with other steps feeding in from and out to other steps associated with a larger method of a more complex system.

FIG. 5 illustrates a flow diagram of example operations of method 500 that can be performed by aspects of the networked system depicted in FIGS. 1 to 3, in accordance with some embodiments of the present disclosure. For example, the method 500 can be performed by any mobile device depicted in FIGS. 1 to 3. Also, the method 500 can be performed by another type of computing device such as a IoT device, smart television, smart watch, glasses or other smart household appliance, in-vehicle information system, wearable smart device, game console, PC, digital camera, or any combination thereof.

In FIG. 5, the method 500 begins at step 502 with retrieving by a mobile device (e.g., see mobile device 302), over a network (e.g., see network(s) 115), a user profile from at least one other computing device (e.g. see computing device 150). The retrieval at step 502 can be according to a security profile (such as security profile 120). At step 504, the method 500 continues with receiving, by the mobile device, a request from a vehicle (e.g., see vehicles 102, 202, and 130) for information in the user profile. At step 506, the method 500 continues with sending by the mobile device, to the vehicle, information in the user profile according to a security protocol (e.g., see security protocol 120) and the request. At step 508, the method 500 continues with receiving by the mobile device, from the vehicle, information propagated from a body control module, a powertrain control module, and/or another type of control module of the vehicle. At step 510, the method 500 continues with updating by the mobile device, according to the security protocol, the user profile with at least part of the information propagated from the body control module, the powertrain control module, and/or the other type of control module of the vehicle. At step 512, the method 500 continues with the mobile device sending the updated user profile to the at least one other computing device.

In some embodiments, it is to be understood that steps 502 to 512 can be implemented as a continuous process such as each step can run independently by monitoring input data, performing operations and outputting data to the subsequent step. Also, steps 502 to 512 can be implemented as discrete-event processes such as each step can be triggered on the events it is supposed to trigger and produce a certain output. It is to be also understood that FIG. 5 represents a minimal method within a possibly larger method of a computer system more complex than the ones presented partly in FIGS. 1 to 3. Thus, the steps depicted in FIG. 5 can be combined with other steps feeding in from and out to other steps associated with a larger method of a more complex system.

User profile information can be generated manually via a UI in which the user enters configurations/preferences for one or more vehicles, and/or the vehicular user profile information can be generated automatically via sensors of the mobile device, feedback from automotive electronics or the computing device(s) of vehicle(s), or from user profile information related to vehicle preference and configuration information that was gathered from other sources such as from Internet browsing, preferences shown in social media, etc. For example, a user that shows interest in sports cars online may have a vehicular user profile having a preference for a sports driving mode or performance driving mode in general. On the other hand, a user that shows an interest online in fuel economy or saving money in general may have a vehicular user profile having a preference for a fuel-economy mode. Also, for example, a user that keeps their passenger environment at approximately 70 degrees Fahrenheit may have a profile showing a preference for 70 degrees. The preference for 70 degrees could also come from a non-vehicular source such as an HVAC controller in the user's home. As imagined, the configurations/preferences are abundant and the ways of generating the configurations/preferences are abundant as well.

The configuration and preference information can pertain to adjustments of the vehicle via automotive electronics (such as adjustments in the transmission, engine, chassis, passenger environment, safety features, etc. via respective automotive electronics). The configuration and preference information can also pertain to automated driving configurations and preferences. The configuration and preference information can pertain to the various levels of automation according to the SAE. Such information can pertain to no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5).

Preference information can include driving mode preferences such as sports or performance mode, fuel economy mode, tow mode, all-electric mode, hybrid mode, AWD mode, FWD mode, RWD mode, 4WD mode, etc. The modes can be specific or general. For example, user prefers specific sports mode of a specific automaker. Or, for example, user prefers fuel economy modes in general over performance modes or sports modes.

On the other hand, configuration information can include specific transmission configurations, engine configurations, chassis configurations, for the user for one or more vehicles. The configuration information can be based on the preference information. And the configuration information can adjust parts of the vehicle via respective electronics for the parts.

The preferences/configurations from the user profile can also relate to preferences/configurations of in-car entertainment systems, automotive navigation systems, passenger conform systems, electronic integrated cockpit systems, etc.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one processing device; and
   memory containing instructions configured to instruct the at least one processing device to:
   automatically generate a user profile for a user using data generated by sensors of a vehicle during use of the vehicle by the user;
   receive, from the vehicle, first data associated with use of the vehicle by the user;
   anonymize, via the processing device, the first data;
   generate update data via machine learning, via the processing device, using the anonymized first data and user profiles of other users as input;
   update the user profile of the user, via the processing device, using the generated update data;
   receive a request from the vehicle for data in the user profile; and
   in response to the request, send data from the updated user profile to the vehicle according to a security protocol, wherein the security protocol provides rules regarding which part of the user profile the vehicle is allowed to use, and the security protocol provides criteria for authorizing use of the user profile.

2. The system of claim 1, wherein the first data relates to activities of the user that are associated with operating the vehicle.

3. The system of claim 1, wherein the first data is provided from at least one of a body control module of the vehicle, or a powertrain control module of the vehicle.

4. The system of claim 1, wherein the user profile is updated according to the security protocol.

5. A system, comprising:
   at least one processing device; and
   memory containing instructions configured to instruct the at least one processing device to:
   receive, via a network connection, data from a user profile according to a protocol for exchanging data that contains personal information;
   receive, from a device located on a vehicle, a request for at least a part of the received data;
   send a portion of the received data to the device in response to the received request;
   after sending the portion of the received data to the device, receive, from the device, additional data;
   transmit the additional data for adding to the user profile according to the protocol; and
   write, according to the protocol, to a first memory, the additional data from the device.

6. The system of claim 5, wherein the device is a powertrain control module configured to control parts of a powertrain of the vehicle according to the portion of the received data from the user profile.

7. The system of claim 5, wherein the portion of the received data is a first portion, the system comprising a body control module configured to control parts of a body of the vehicle, and wherein the instructions are configured to instruct the at least one processing device to:
   receive, from the body control module, a request for at least a part of the received data from the user profile;
   send a second portion of the received data from the user profile to the body control module in response to the request from the body control module;
   transmit data from the body control module for adding to the user profile according to the protocol; and
   write, according to the protocol, to the first memory, data from the body control module.

8. The system of claim 7, wherein the body control module is configured to control parts of the body according to the second portion of the received data from the user profile.

9. The system of claim 5, wherein the instructions are configured to instruct the at least one processing device to, when the vehicle is used by a user:
   generate data about use of the vehicle by the user; and
   add the generated data to the user profile according to the protocol.

10. The system of claim 5, wherein the instructions are configured to instruct the at least one processing device to anonymize at least part of the received data from the user profile according to the protocol to provide the anonymized data as input for analytics, and wherein the input for the analytics includes data received from a plurality of user profiles.

11. The system of claim 5, wherein the instructions are configured to instruct the at least one processing device to anonymize at least part of the received data from the user profile according to the protocol to provide the anonymized data as input for machine learning to generate statistics and other machine learned data to be combined with generated statistics and other machine learned data of other users.

12. The system of claim 5, wherein:
   the user profile comprises at least one of an identification of a user, preferences of the user in a plurality of categories, or histories of activities of the user associated with the plurality of categories;
   the plurality of categories comprises driving preferences of the user; and
   the histories of activities comprises histories of driving activities of the user.

13. The system of claim 12, wherein the plurality of categories comprises driving preferences of the user communicated from the vehicle and other sources, and wherein the histories of activities comprise histories of driving activities of the user communicated from the vehicle and other sources.

14. A method, comprising:
   automatically generating a user profile for a user using data generated by sensors of a vehicle during use of the vehicle by the user;
   receiving, from the vehicle, first data associated with the user;
   anonymizing, via a processing device, the first data;
   generating update data via machine learning, via the processing device, using the anonymized first data and user profiles of other users as input;
   updating the user profile of the user, via the processing device, using the generated update data;
   receiving a request from the vehicle for data in the user profile; and
   in response to receiving the request, sending data from the user profile to the vehicle according to a security protocol, wherein the security protocol provides rules regarding which part of the user profile the vehicle is allowed to use.

15. The method of claim 14, wherein the first data relates to activities of the user that are associated with operating the vehicle.

16. The method of claim 14, wherein the first data is provided from at least one of a body control module of the vehicle, or a powertrain control module of the vehicle.

* * * * *